(12) United States Patent
Chuprevich et al.

(10) Patent No.: US 11,657,450 B1
(45) Date of Patent: *May 23, 2023

(54) USER INTERFACE FOR INTERFACING WITH HUMAN USERS

(71) Applicant: Wells Fargo Bank, N.A., San Francisco, CA (US)

(72) Inventors: John Andrew Chuprevich, Davidson, NC (US); Eric M. Huitger, Charlotte, NC (US); Akiva D. Kates, Charlotte, NC (US); Ray G. Redwood, Charlotte, NC (US); Teresa Lynn Rench, Mount Holly, NC (US)

(73) Assignee: Wells Fargo Bank, N.A, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/531,036

(22) Filed: Nov. 19, 2021

Related U.S. Application Data

(63) Continuation of application No. 16/352,550, filed on Mar. 13, 2019, now Pat. No. 11,182,850.

(Continued)

(51) Int. Cl.
*G06Q 40/02* (2023.01)
*G06F 9/451* (2018.01)
(Continued)

(52) U.S. Cl.
CPC ............ *G06Q 40/02* (2013.01); *G06F 9/451* (2018.02); *G06F 3/0484* (2013.01); *G06F 3/04883* (2013.01)

(58) Field of Classification Search
None
See application file for complete search history.

(56) References Cited

U.S. PATENT DOCUMENTS

| 7,991,675 B2 | 8/2011 | Loeper |
| 8,341,057 B1 | 12/2012 | Wagner et al. |

(Continued)

OTHER PUBLICATIONS

"U.S. Appl. No. 16/352,550, Examiner Interview Summary dated Jul. 1, 2020", 3 pgs.

(Continued)

*Primary Examiner* — Bruce I Ebersman
*Assistant Examiner* — Matthew Cobb
(74) *Attorney, Agent, or Firm* — Schwegman Lundberg & Woessner, P.A.

(57) ABSTRACT

Various examples are directed to systems and methods for interfacing a computing system to a human user. For example, a computing system may provide a graphical user interface at a display of a user computing device. The user interface may include a positive financial profile indicator at a first position on the display; a negative financial profile indicator at a second position on the display opposite the positive financial profile indicator; and a user financial profile indicator describing a user, the user financial profile indicator positioned between the positive financial profile indicator and the negative financial profile indicator. The computing system may receive user transaction data describing a financial transaction. The computing system may determine that the financial transaction worsens a financial profile of the user. The computing system may also modify the user interface to orient the user financial profile indicator towards the negative financial profile indicator.

20 Claims, 13 Drawing Sheets

Related U.S. Application Data

(60) Provisional application No. 62/642,377, filed on Mar. 13, 2018.

(51) Int. Cl.
    *G06F 3/0484*     (2022.01)
    *G06F 3/04883*     (2022.01)

(56) References Cited

U.S. PATENT DOCUMENTS

| | | |
|---|---|---|
| 8,812,379 B2 | 8/2014 | Torre et al. |
| 9,582,647 B2 | 2/2017 | Kenedy et al. |
| 10,460,395 B2* | 10/2019 | Grassadonia ......... G06Q 40/12 |
| 2012/0218200 A1* | 8/2012 | Glazer ............... G06F 3/04883 345/173 |
| 2014/0279327 A1 | 9/2014 | Keyes |
| 2014/0365355 A1 | 12/2014 | Shvarts |
| 2015/0073929 A1* | 3/2015 | Psota ................ G06Q 30/0605 705/26.2 |
| 2016/0358180 A1* | 12/2016 | Van Os ............... G06Q 20/321 |
| 2017/0011398 A1* | 1/2017 | Narasimhan ......... G06Q 20/108 |
| 2017/0206526 A1* | 7/2017 | Bunnell ................ G06Q 40/02 |
| 2017/0278125 A1* | 9/2017 | Tietzen ............. G06Q 30/0229 |

OTHER PUBLICATIONS

"U.S. Appl. No. 16/352,550, Final Office Action dated Oct. 23, 2020".

"U.S. Appl. No. 16/352,550, Non Final Office Action dated Apr. 16, 2020", 32 pgs.

"U.S. Appl. No. 16/352,550, Notice of Allowance dated Jun. 16, 2021".

"U.S. Appl. No. 16/352,550, PTO Response to Rule 312 Communication dated Oct. 27, 2021", 2 pgs.

"U.S. Appl. No. 16/352,550, Response filed Jul. 15, 2020 to Non Final Office Action dated Apr. 16, 2020", 21 pgs.

"U.S. Appl. No. 16/352,550, Response filed Dec. 21, 2020 to Final Office Action dated Oct. 23, 2020".

"The ESL Game of Life: A Simulation", [Online], [Accessed Mar. 8, 2018], Retrieved from the Internet: <URL: www.nc-net.info/ELA/Fayetteville/The_Game_of_Life.doc>, 39 pgs.

* cited by examiner

USER INTERFACE FOR INTERFACING WITH HUMAN USERS

CROSS-REFERENCE TO RELATED APPLICATION

This application is a continuation of U.S. application Ser. No. 16/352,550, filed Mar. 13, 2019, which claims the benefit of U.S. Provisional Patent Application No. 62/642,377, filed Mar. 13, 2018, which applications are incorporated by reference herein in their entirety.

TECHNICAL FIELD

Embodiments described herein generally relate to systems and methods for interfacing a computing device or system of computing devices to a human user. For example, embodiments described herein are directed to systems and methods for generating and/or serving a user interface for tracking deposits and expenses.

BACKGROUND

Computing technology permits the processing and management of large quantities of data at high speed. In the context of financial management, computing devices and systems of computing devices are capable of processing deposits, expenses, and other financial variables for users. The capabilities of computing technology, however, cannot be put to their best use unless the user is able to clearly understand the underlying processing.

Drawings

In the drawings, which are not necessarily drawn to scale, like numerals may describe similar components in different views. Like numerals having different letter suffixes may represent different instances of similar components. Some embodiments are illustrated by way of example, and not of limitation, in the figures of the accompanying drawings.

DETAILED DESCRIPTION

Figure 1:
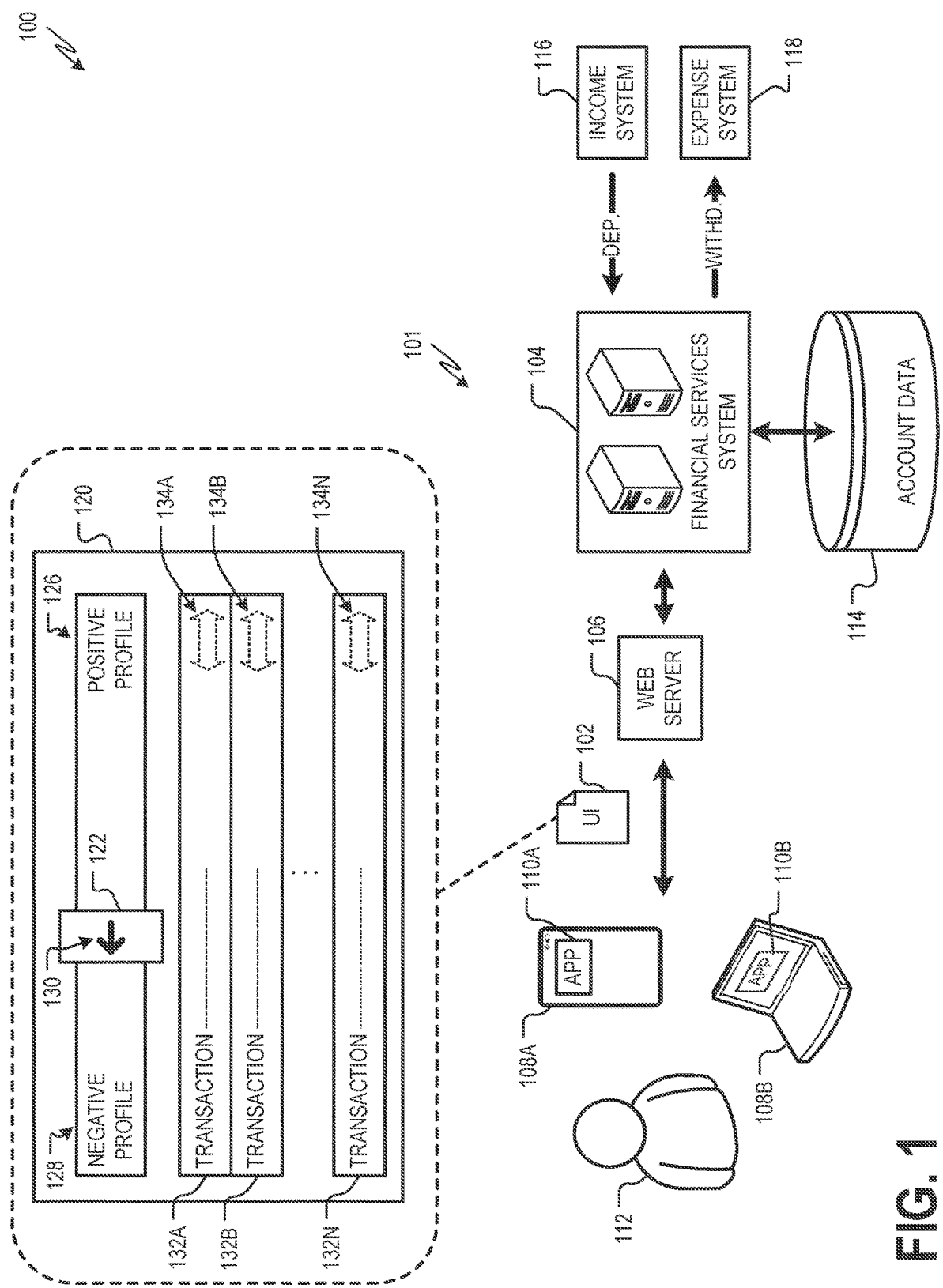
FIG. 1 is a diagram showing one example of an environment for implementing a user interface for interfacing with a human user.

Various examples are directed to systems and methods for interfacing a computing device or system of computing devices to a human user. A computing device generates a user interface that may be served to the human user. The user interface may be configured to provide the user with rich information regarding the processing of the computing device, for example, as it relates to deposits to a financial account and user expenses.

In some examples, the user interface described herein is served to users to help the users track their spending and income. Computing devices are capable of tracking minute details of a user's spending and income. Presenting spending and/or income data to user in an understandable and actionable manner, however, can be significantly more difficult.

Various examples described herein are directed to computing systems and methods to generate and serve a graphical user interface (UI) to a human user. The UI is displayed at a screen or other display of a user computing device and there may be viewed by the human user. The UI includes a positive financial profile indicator, a negative financial profile indicator, and a user financial profile indicator. The positive financial profile indicator represents a favorable financial profile (e.g., a financial profile to which the user does or should aspire). For example, the positive financial profile may be associated with values and/or ranges of values for various financial metrics, such as savings-to-income ratio, debt-to-income ratio, retirement savings level, etc. The negative financial profile indicator represents an unfavorable financial profile (e.g., a financial profile to which the user does not or should not aspire). For example, the negative financial profile may be associated with negative values and/or ranges of values for various financial metrics.

The user financial profile indicator represents the user's financial profile. For example, the user's financial profile may be determined by actual values for the various financial metrics describing the user. The user financial profile indicator may be positioned at the UI between the positive financial profile indicator and the negative financial profile indicator. The orientation of the user financial profile indicator indicates whether the user's financial profile is more similar to the positive financial profile or more similar to the negative financial profile. For example, if the user's financial profile is more similar to the positive financial profile, the user financial profile indicator may be oriented towards the positive financial profile indicator. Similarly, if the user's financial profile is more similar to the negative financial profile, the user financial profile indicator may be oriented towards the negative financial profile indicator.

The orientation of the user financial profile indicator may be indicated in a number of suitable ways. In some examples, the orientation of a user financial profile indicator is indicated by the position of the user financial profile indicator. For example, when the user's financial profile is closer to the positive financial profile, the user financial profile indicator may be positioned closer to the positive financial profile indicator than to the negative financial profile indicator. Similarly, when the user's financial profile is closer to the negative financial profile, the user financial profile indicator may be positioned closer to the negative financial profile indicator than to the positive financial profile indicator.

In some examples, the orientation of the user financial The direction of the user financial profile indicator may be indicated by a direction indicator and/or by a directionality of the user financial profile indicator. A direction indicator shows a direction in the spatial arrangement of the UI that is associated with the user financial profile indicator. For example, the direction indicator may be an arrow, where the point of the arrow indicates the direction of the user financial profile indicator. Also, in some examples, the user financial profile indicator is or includes a thing that has directionality. A thing with directionality is a thing that has a defined front and can be said to point in a particular way. The way in which a directional thing points is its direction. For example, a face has directionality, where the direction of the face is the direction in which the face is "looking," indicated by the nose, the eyes, etc. Also, many vehicles have directionality, where the direction of the vehicle is the forward direction in which the vehicle travels. For example, the directionality of a car, truck, or bus is indicated by the position of the windshield, headlights, or other suitable features.

A computing system (e.g., including the user computing device and/or other associated computing devices) determines the positive financial profile, the negative financial profile, and the user financial profile. The UI is generated, as described, as a visual representation of the positive financial profile, the negative financial profile, and the user financial profile.

In some examples, the computing system updates the UI as the user participates in financial transactions. For example, the user may make a spending transaction that worsens the user financial profile. For example, the user may make an impulse purchase. In this case, the computing system modifies the UI to orient the user financial profile indicator more towards the negative financial profile indicator. Also, for example, the user may make a spending transaction that improves the user financial profile. For example, the user may take an extra job or gig work. Also, for example, the user may sell a car with a high payment and replace it with another car having a lower payment, etc. In this case, the computing system modifies the UI to orient the user financial profile indicator more towards a positive financial profile. In this way, the computing system communicates to the user an indication of the user's financial health in a way that the user can quickly and simply understand.

In some examples, the UI includes features that alert the user to the significance of some completed and/or proposed transactions. For example, the computing system determines that a proposed or completed transaction moves the user financial profile towards the negative financial profile by more than a threshold amount. If so, the computing system pushes an alert to an output device of the user computing device (e.g., a screen, a speaker, etc.). The alert may be part of the UI and/or may be pushed to the output device even if the UI is not being displayed at that time. For example, the alert may be pushed to an output device while the user computing device is executing another application, such as a web browser, an electronic wallet application, etc.

Also, in some examples, the computing system includes features that classify transactions based on user satisfaction. For example, the user may have purchased an expensive latte. This may worsen the user's financial profile, but the user may determine that the transaction is justified based on the satisfaction provided by the latte. The computing system may solicit user satisfaction data through the UI. For example, the UI may include indicators of previous financial transactions of the user. The user classifies the transactions based on a user satisfaction level for the transactions. In some examples, the user indicates satisfaction or dissatisfaction with a transaction by swiping the financial transaction indicator a particular way. For example, the user may swipe the financial transaction indicator towards the negative financial profile indicator to indicate dissatisfaction and towards the positive transaction indicator to indicate satisfaction. The computing system classifies further transactions by comparing the future transactions to previous transactions.

A satisfaction classification for a current transaction can be used in any of a number of different ways. In some examples, the computing system considers the satisfaction classification of a transaction when determining whether to push an alert. For example, the computing system may push an alert in response to a proposed or completed transaction if it worsens the user's financial profile by more than the threshold amount and the transaction is classified as a low-satisfaction transaction. Also, in some examples, the threshold amount that a transaction worsens (and/or improves) the user's financial profile may be different depending on the satisfaction classification of the transaction.

FIG. 1 is a diagram showing one example of an environment 100 for implementing a user interface 102 for interfacing with a human user 112. The environment 100 includes a graphical user interface or UI 102 that is served to one or more user computing device 108A, 108B. In the example of FIG. 1, the UI 102 is served by a web server 106 that is in communication with a financial services system 104. A computing system 101 for providing the UI 102 to the user 112 may include some or all of the financial services system 104, the web server 106, and/or the user computing devices 108A, 108B.

The user computing devices 108A, 108B may be any suitable computing device or devices such as, for example, a smart phone, a tablet computer, a laptop computer, a smart watch, etc. User computing devices 108A, 108B comprise input/output (I/O) devices for providing the UI 102 to the user 112. For example, user computing devices 108A, 108B comprise a display for showing the UI 102 to a user 112. In some examples, user computing devices 108A, 108B execute an application 110A, 110B that facilitates the provision of the UI 102. In some examples, the application 110A, 110B is a web browser that communicates with the web server 106 to receive and display the UI 102. For example, the UI 102 may be or include a web page displayed at the user computing device 108A, 108B via the web browser. Also, in some examples, the application 110A, 110B is an application that otherwise communicates with the web server 106 and/or financial services system 104. For example, the application 110A, 110B may be or include a mobile or other application that includes an embedded web view or other view that receives a web document from the web server 106. Also, in some examples, the web server 106 is bypassed or eliminated and the application 110A, 110B communicates directly with the financial services system 104 to receive financial data, generate the UI 102, and/or serve the UI 102. Although two user computing devices 108A, 108B are shown in FIG. 1, in some examples, the user 112 receives the UI 102 at a single user computing device (e.g., one of 108A or 108B). In some examples, the user 112 receives the UI 102 at different user computing devices 108A, 108B at different times.

The environment 100 also includes a financial services system 104. The financial services system 104 includes one or more computing devices that may be at a common geographic location or may be distributed across multiple geographic applications. The financial services system 104 tracks and/or administers one or more accounts held by the user 112. Accounts tracked and/or administered by the financial services system 104 may include savings accounts, demand deposit accounts, credit accounts (e.g., credit cards), etc. Account data, including records of financial transactions, such as deposits and withdrawals, may be stored at one or more account databases 114.

The financial services system 104 receives data regarding financial transactions of the user 112 (e.g., deposits to and/or withdrawals from the user's accounts). For example, the financial services system 104 may receive deposit data describing one or more deposits to an account or account of the user 112. Deposit data is received from one or more income systems 116. The one or more income systems 116 represent sources of income to the user 112 such as, for example, a bank system, a payroll system, or other system associated with an employer, customer, client or other person making a payment to the user.

The financial services system 104 may also receive withdrawal data describing one or more withdrawals from an account or accounts of the user 112. Withdrawal data may be received from one or more expense systems 118. Expense systems 118 represent parties to which the user 112 makes a payment and may include, merchants, banks, (e.g., loan payments, investment or savings contributions), etc.

The computing system 101 is described herein as including the financial services system 104, the web server 106, and the user computing device(s) 108A, 108B. In some examples, the computing system 101 may include more or fewer components. For example, various functionality described herein as being performed by the computing system 101 may be performed by any one or more of the financial services system 104, the web server 106, and/or the user computing devices 108A, 108B. Also, one or more of the financial services system 104, the web server 106, and/or the user computing devices 108A, 108B may be omitted in some examples.

FIG. 1 also depicts an example screen 120 from the UI 102. The screen 120 includes a positive financial profile indicator 126, a negative financial profile indicator 128, and a user financial profile indicator 122. In the example of FIG. 1, the indicators 126, 128, 122 are arranged as a slider bar, with the positive financial profile indicator 126 positioned on one side of the slider bar, the negative financial profile indicator 128 on an opposite side of the slider bar, and the user financial profile indicator 122 positioned there between. The orientation of the user financial profile indicator 122 relative to the other indicators 126, 128 is shown by the position of the user financial profile indicator 122 on the bar. For example, when the user financial profile indicator 122 is closer to the negative financial profile indicator 128, it may indicate that the user's financial profile is closer to the negative financial profile. When the user financial profile indicator 122 is closer to the positive financial profile indicator 126, it may indicate that the user's financial profile is closer to the negative financial profile.

In the example of FIG. 1, the user financial profile indicator 122 has a direction indicated by a direction indicator 130. In this example, the user financial profile indicator 122 is directed towards the negative profile, as this is the direction indicated by the arrow/direction indicator 130. In the example of FIG. 1, the user financial profile indicator 122 is oriented towards the negative financial profile indicator 128, as indicated by the position of the user financial profile indicator 122, which is closer to the negative financial profile indicator 128 than to the positive financial profile indicator 126, and by the direction indicator 130. In some examples, different aspects of the orientation of the user financial profile indicator 122 indicate different aspects of the user's financial profile relative to the positive financial profile and the negative financial profile. For example, the position of the user financial profile indicator 122 may indicate the user's current financial profile relative to the negative and positive financial profiles. The direction of the user financial profile indicator 122 (e.g., indicated by a direction indicator and/or the directionality of the user financial profile indicator 122) may indicate a direction in which the user's financial profile is moving. For example, if the user's financial profile is closer to the negative financial profile, but improving, then the position of the user financial profile indicator 122 may be closer to that of the negative financial profile indicator 128, while the direction of the user financial profile indicator 122 may be towards the positive financial profile indicator 126.

The screen 120 also shows transaction indicators 132A, 132B, 132N. Although three are shown, any suitable number of transaction indicators 132A, 132B, 132N may be displayed at the screen 120. Also, in some examples, transaction indicators 132A, 132N may be omitted. The user 112 may provide user satisfaction data, for example, by providing an indication of satisfaction with the financial transactions associated with transaction indicators 132A, 132B, 132N. For example, the user 112 may "swipe left" or "swipe right," as indicated by arrows 134A, 134B, 134N. In some examples, swiping towards the positive financial profile indicator 126 (right in FIG. 1) indicates a high level of user satisfaction with the corresponding financial transaction, and swiping towards the negative financial profile indicator 128 (e.g., left in FIG. 1) indicates a low level of user satisfaction with the corresponding financial transaction. User satisfaction data may base used in the UI, for example, as described herein. The user computing device 108A, 108B detects the swiping motion, for example, across a touch sensitive display.

Figure 2:
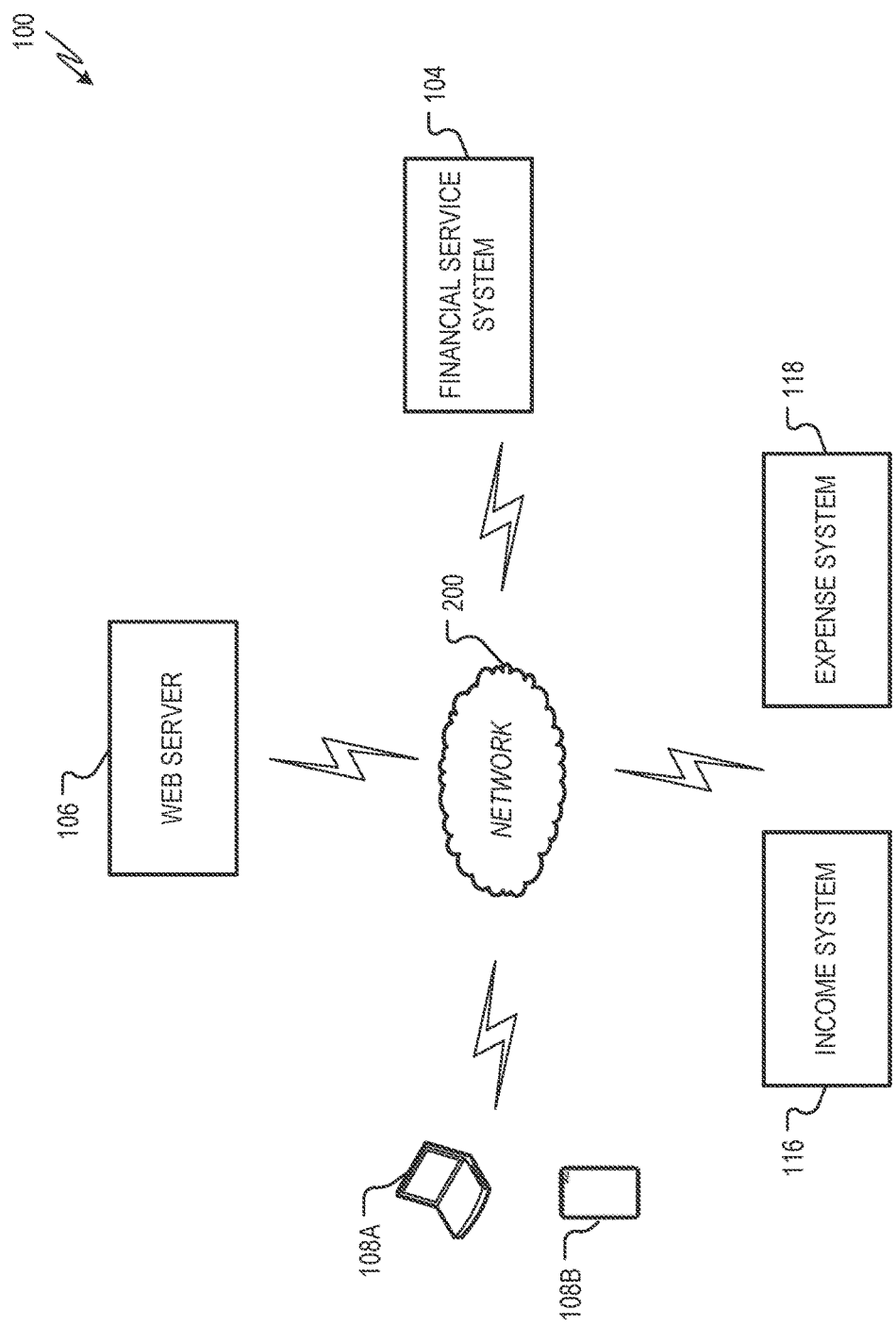
FIG. 2 is a diagram showing another example of the environment including additional details.

FIG. 2 is a diagram showing another example of the environment 100 including additional details. In the example of FIG. 2, the user computing devices 108A, 108B, the financial services system 104, the web server 106, the one or more income systems 116, the one or more expense systems 118, are in communication with one another via a network 200. The network 200 may be or comprise any suitable network element operated according to any suitable network protocol. For example, one or more portions of the network 200 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, a wireless network, a Wi-Fi network, a WiMax network, another type of network, or a combination of two or more such networks, etc.

Figure 3:
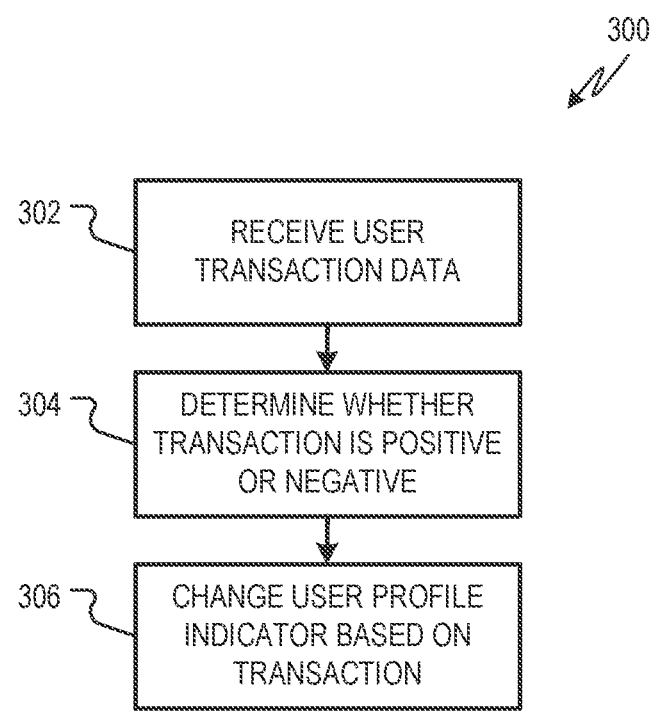
FIG. 3 is a flow chart showing one example of a process flow that may be executed by a computing system to provide a user interface (UI) to a user.

FIG. 3 is a flow chart showing one example of a process flow 300 that may be executed by a computing system, such as the computing system 101, to provide a UI, such as the UI 102, to a user, such as the user 112. At operation 302, the computing system receives user transaction data. The user transaction data describes a financial transaction of the user. The transaction may be a deposit to and/or a withdrawal from an account held by the user.

At operation 304, the computing system determines whether the transaction is positive or negative for the user's financial profile. This may be accomplished in any suitable manner. For example, the positive and negative financial profiles may be associated with values or ranges of values for financial metrics. To rate the financial transaction, the computing system accesses and/or determines a previous user financial profile before the financial transaction and an updated user financial profile after the transaction. A financial transaction is positive if the updated user financial profile is closer to the positive financial profile than the previous user financial profile. A financial transaction is negative if the updated user financial profile is closer to the negative financial profile than the previous user financial profile.

The distance between financial profiles may be determined, for example, using a multi-variate distance where the variables correspond to the financial metrics used to characterize the different profiles. In some examples, a financial profile is described by a position in an X-dimensional space, where X is the number of financial metrics considered. The distance between two financial profiles is the Euclidian distance between the positions of the two financial profiles in X-dimensional space. In some examples, different financial metrics may be weighted differently than other financial metrics when finding the position of a financial profile in X-dimensional space. It is envisioned that alternative suitable techniques may be used to find the distance or difference between financial profiles.

At operation 306, the computing system changes the orientation of the user financial profile indicator at the UI based at least in part on the financial transaction. For example, if the transaction has caused the user's financial profile to move towards the positive financial profile, the orientation of the user financial profile indicator is moved towards the positive financial profile indicator. For example, the user financial profile indicator may be moved towards the positive financial profile indicator. In addition to or instead of moving the user financial profile indicator towards the positive financial profile indicator, if the user financial profile indicator is associated with a direction, the direction of the user financial profile indicator may be changed to point towards the positive financial profile indicator.

Figure 4:
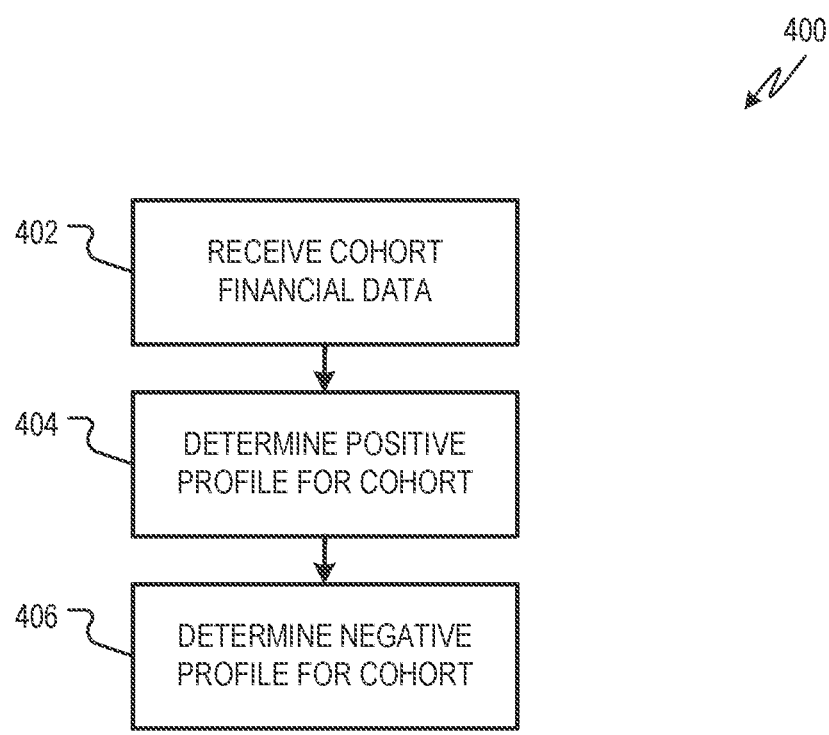
FIG. 4 is a flow chart showing one example of a process flow that may be executed by the computing system to generate financial profiles for generating a UI.

FIG. 4 is a flow chart showing one example of a process flow 400 that may be executed by the computing system, such as the computing system 101, to generate financial profiles for generating a UI, such as the UI 102. At operation 402, the computing system receives cohort financial data. The cohort financial data describes the finances of users in one or more financial cohorts that are similar or equal to the financial cohort of the user. Financial cohorts may be measured by any suitable financial metric such as, for example, age, income, assets, etc.

At operation 404, the computing system determines a positive financial profile. The positive financial profile may be found in any suitable way. For example, the computing system may identify a top portion of the cohort of users having the most positive financial profile. The top portion may be a top 1%, top 5%, top 10%, or any other suitable value. The top portion may be identified, for example, by finding a position of the financial profiles of users in the cohort. The top portion may be the portion having the most favorable financial profile positions. The favorability of a financial profile may be determined, for example, by comparing the financial profile to a hypothetical ideal profile. The positive profile may be described by a set of values for financial metrics. The values may be the average values of the top portion and/or threshold values for the top portion. Threshold values may be the lowest values and/or the lowest financial profile position that would place a user in the top portion. At operation 406, the computing system determines a negative financial profile. The negative financial profile may be determined in a manner similar to that used to determine the positive financial profile.

Figure 5:
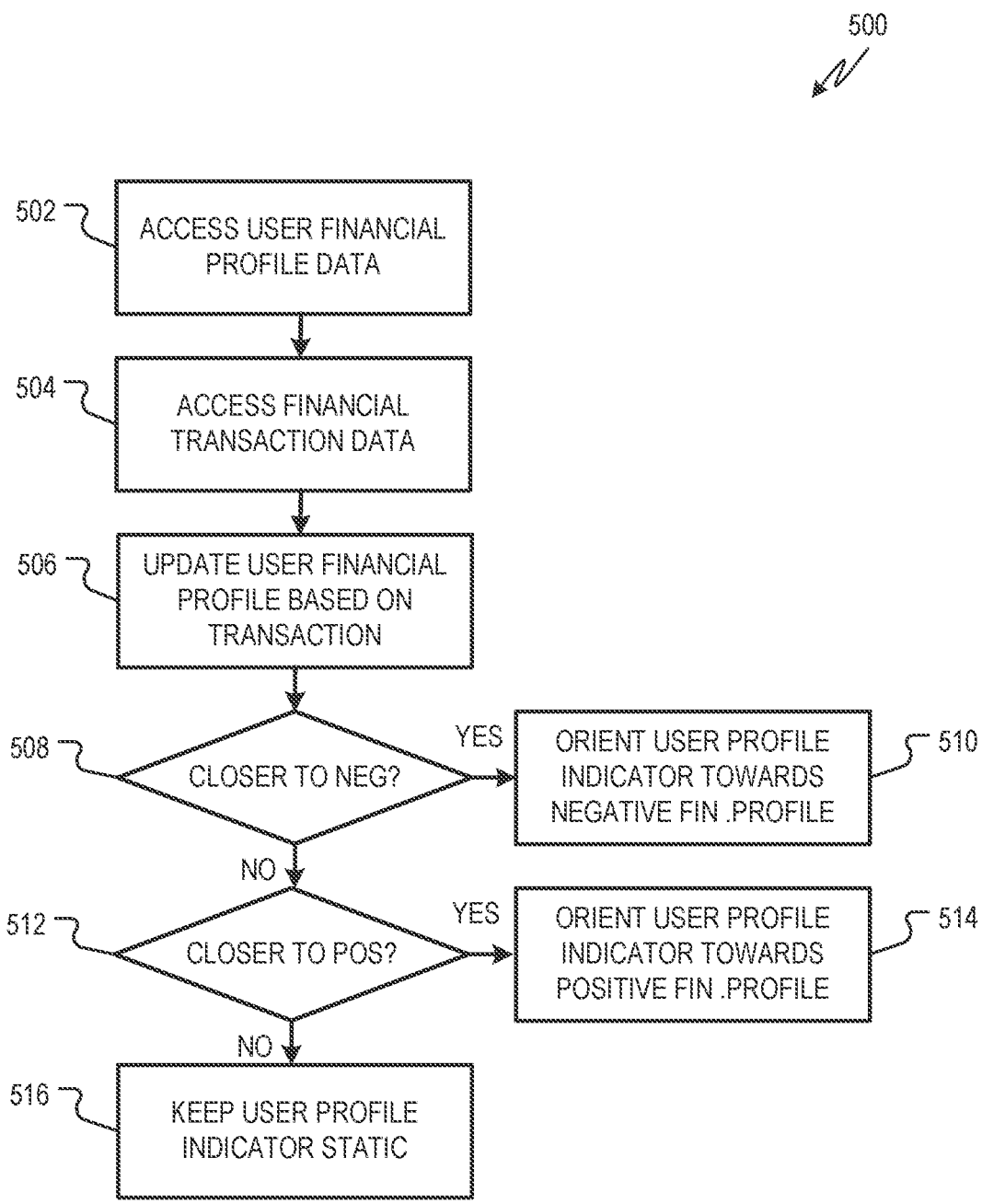
FIG. 5 is a flow chart showing one example of a process flow that may be executed by a computing system to generate a UI.

FIG. 5 is a flow chart showing one example of a process flow 500 that may be executed by a computing system to generate a UI, such as the UI 102. At operation 502, the computing system receives user financial profile data. The user financial profile data describes a financial profile of the user. For example, the user financial profile data may include values for various financial metrics describing the user. In some examples, the user financial profile data includes underlying financial information that can be used to determine values for the metrics such as, for example, a savings value, an income value, etc.

At operation 504, the computing system accesses financial transaction data describing a financial transaction that is either proposed or has been executed by the user. For example, the UI may be provided while the user has entered information about the transaction, but has not yet completed it. At operation 506, the computing system determines an updated user financial profile based on the financial transaction. For example, the computing system generates an updated user financial profile considering the financial transaction. The updated user financial profile may include, for example, values for one or more financial metrics.

At operation 508, the computing system determines if the updated user financial profile is closer to a negative financial profile than the previous user financial profile (e.g., described by the user financial profile data received at operation 502). This indicates that the financial transaction worsens the user's financial profile. If yes, then, at operation 510, the computing system orients the user financial profile indicator towards the negative user financial profile indicator, for example, by moving the user financial profile indicator towards the negative financial profile indicator and/or by changing a direction of the user financial profile indicator to point towards the negative financial profile indicator.

If the updated user financial profile is not closer to the negative financial profile than the previous user financial profile, then the computing system determines, at operation 512, if the updated user financial profile is closer to the positive financial profile than the previous user financial profile. If yes, then, at operation 514, the computing system orients the user financial profile indicator towards the positive user financial profile indicator, for example, by moving the user financial profile indicator towards the positive financial profile indicator and/or by changing a direction of the user financial profile indicator to point towards the positive financial profile indicator. If the updated user financial profile is closer to neither the negative financial profile nor to the positive financial profile, then the computing system keeps the user financial profile indicator static at operation 516.

Figure 6:
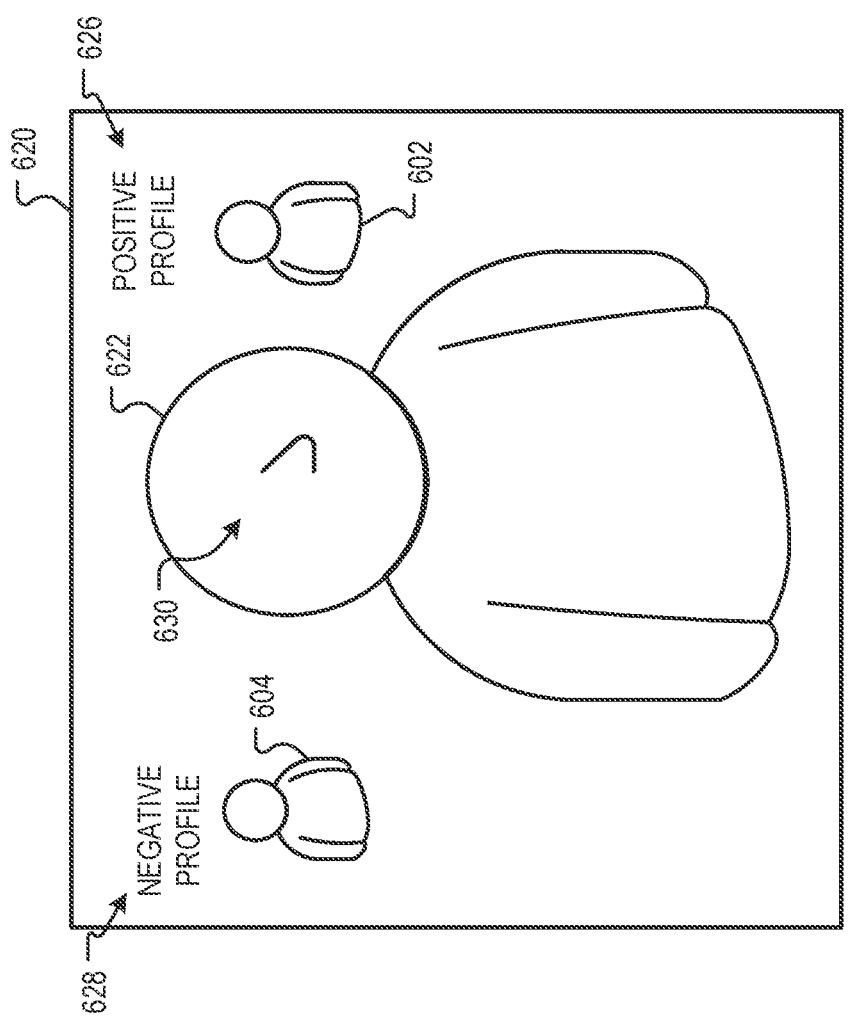
FIG. 6 is an example screen showing an alternate arrangement of the UI of FIG. 1.

FIG. 6 is an example screen 620 showing an alternate arrangement of the UI 102 of FIG. 1. In the example of FIG. 6, the user financial profile indicator 622 includes an anthropomorphic figure of a person. The user financial profile indicator 622 has a direction indicator 630 which, in this example, is a nose of the figure. In some examples, an anthropomorphic figure is a thing with directionality in the direction of the figure's face. Accordingly, the direction of the user financial profile indicator 622 may be the direction in which the face is pointing.

In the example of FIG. 6, the negative financial profile indicator 628 and positive financial profile indicator 626 include respective anthropomorphic FIGS. 604, 602. The anthropomorphic FIGS. 604, 602 may be stylized to reflect example consequences of positive and/or negative financial choices. For example, the negative FIG. 604 may be depicted in a manner indicating that the FIG. 604 is unwell. For example, the FIG. 604 may show wrinkles or other signs of aging, show indicators of sickness, such as a hot water bottle on the head, a thermometer in the mouth, etc. The positive FIG. 602, on the other hand, may depict a person who is in better health. For example, the positive FIG. 602 may show a person with clear skin who is well-dressed, exercising, and/or enjoying expensive assets. The user financial profile indicator 622 may take on aspects of the physical appearance of the positive financial profile indicator and/or the negative financial profile indicator, depending on whether it is oriented towards the positive financial profile indicator or towards the negative financial profile indicator.

In another example, the negative FIG. 604 may represent a negative archetypal creature, such as a devil, while the positive FIG. 602 may represent a positive archetypal creature, such as an angel. For example, the negative FIG. 604 may have a red complexion with horns and a trident. The positive FIG. 602 may have a white robe, wings, and a halo. The appearance of the user financial profile indicator 622 may be changed to resemble either the devil or the angle depending on the financial profile of the user.

Figure 7:
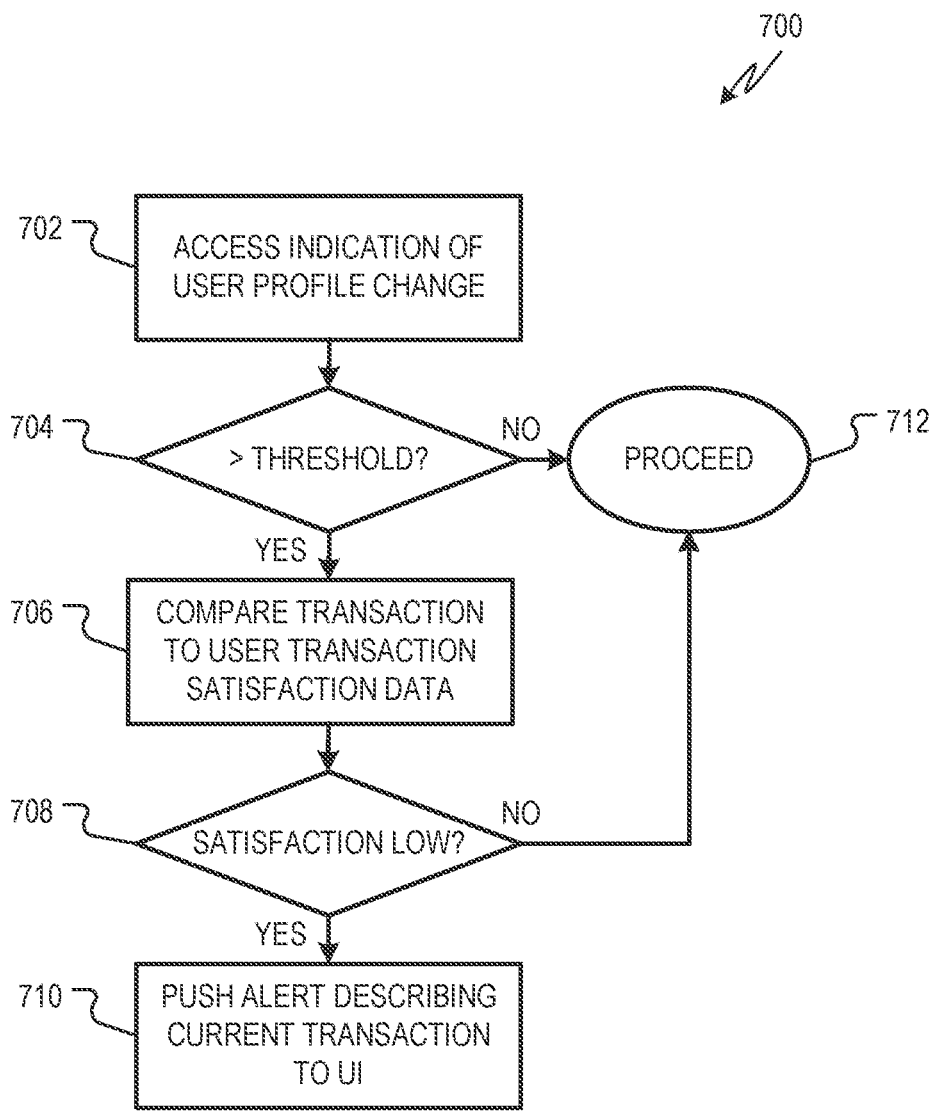
FIG. 7 is a flow chart showing one example of a process flow that may be executed by a computing system to provide a push message in response to a proposed or actual change in the user's financial profile.

FIG. 7 is a flow chart showing one example of a process flow 700 that may be executed by a computing system to provide a push message in response to a proposed or actual change in the user's financial profile. At operation 702, the computing system accesses an indication of a user financial profile change. The change may be the result of one or more transactions entered into or proposed by the user. For example, the user may scan a credit card, engage a mobile wallet application, or otherwise propose or complete a transaction. The transaction may bring about a change in the user's financial profile.

At operation 704, the computing system determines if the change in the user's financial profile is at greater than a threshold level. The level of a change to the user's financial profile may be determined in any suitable manner. For example, the computing system may determine and/or access a distance between the positive financial profile and the negative financial profile. The threshold level of change may correspond to a percentage of that distance. If the change is less than the threshold, then the computing system may proceed with its processing at operation 712. This may include, for example, modifying the orientation of the user financial profile indicator, etc.

If the change to the user's financial profile is greater than the threshold at operation 704, the computing system compares the transaction that prompted the change to user transaction satisfaction data at operation 706. For example, the computing system may classify the transaction as satisfactory or unsatisfactory to the user based on the comparison. For example, the user transaction satisfaction data may describe properties of transactions for which the user had a high level of satisfaction. Such properties may include, for example, an amount, a merchant where the transaction occurred, etc.

Figure 8:
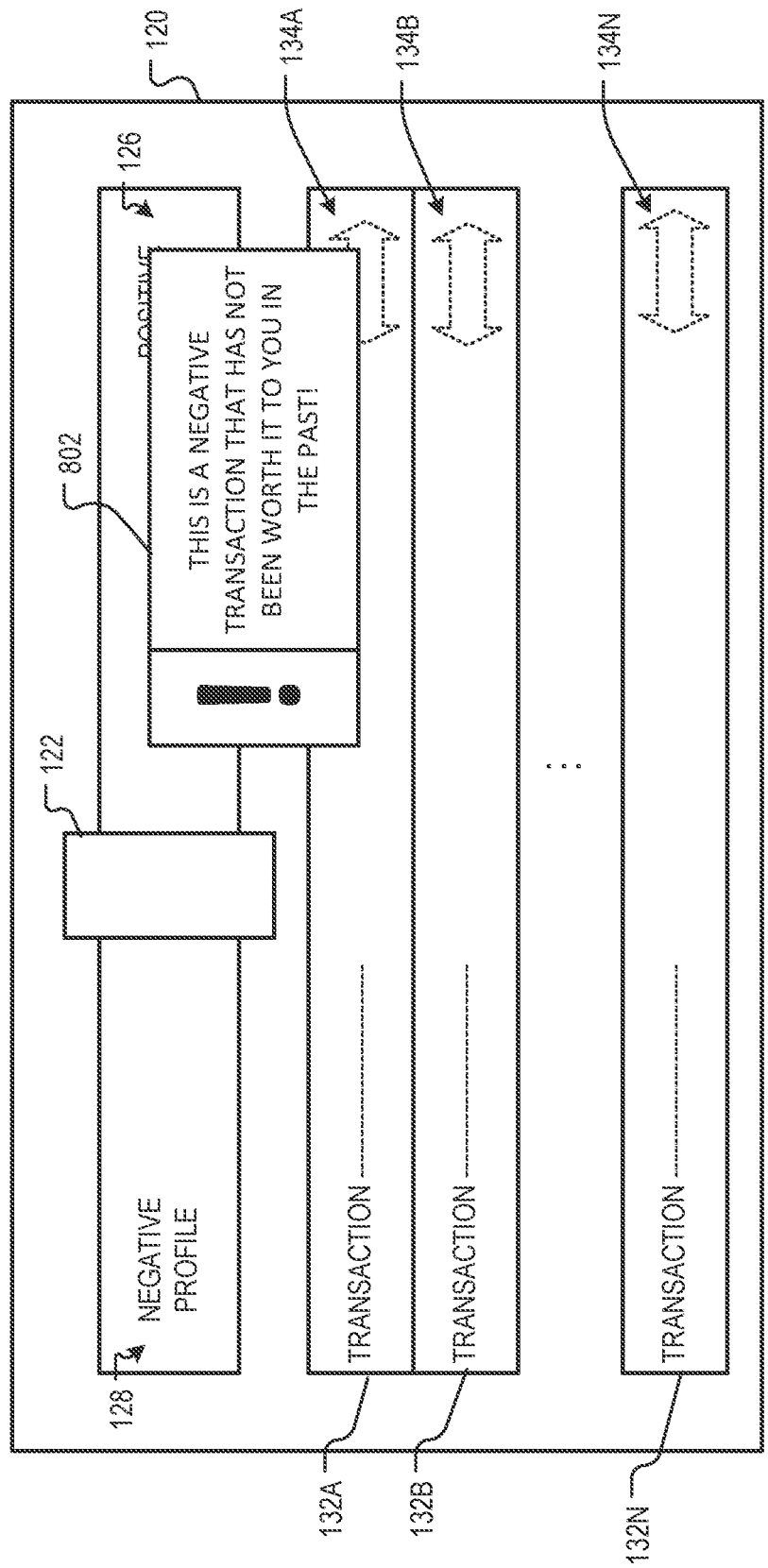
FIG. 8 is a view showing one example of the screen of FIG. 1 showing a window displayed over the other elements of the screen.

At operation 708, the computing system determines whether a user satisfaction level for the transaction is low. If, at operation 708, the user's satisfaction is not low, the computing system may proceed at operation 712. If, on the other hand, the user's satisfaction is low at operation 708, the computing system pushes to the user an alert message describing the current transaction at operation 710. The message may be pushed in any suitable manner. For example, a screen pop or window may be displayed at the user computing device, for example over top of the currently active window. FIG. 8 is a view showing one example of the screen 120 of FIG. 1 showing a window 802 displayed over the other elements of the screen 120. The window 802 indicates that a current and/or recent transaction is negative and is unsatisfactory.

Also, in some examples, a push alert may be written to a notification tray of an operating system of the user computing device. In examples where the financial transaction is proposed (e.g., not yet completed), the user may decline to execute the financial transaction so as to avoid the negative, unsatisfactory changes to his or her financial profile. In examples where the financial transaction has already been completed, the user may receive the push notification as feedback indicating, for example, that similar financial transaction should be avoided in the future.

In the arrangement of FIG. 7, a transaction results in a push alert if the transaction results in more than a threshold level of negative change to the user's financial profile and if the transaction is determined to be unsatisfactory to the user. In some examples, the computing system may apply these conditions independent of user satisfaction. For example, instead of or in addition to what is shown in FIG. 7, in some examples, a push alert may be sent for every transaction that results in more than the negative level of change to the user's financial profile (e.g., operations 706 and 708 may be omitted). Also, in some examples, in addition to or instead of what is shown in FIG. 8, a push alert may be sent for every transaction that is unsatisfactory.

Figure 9:
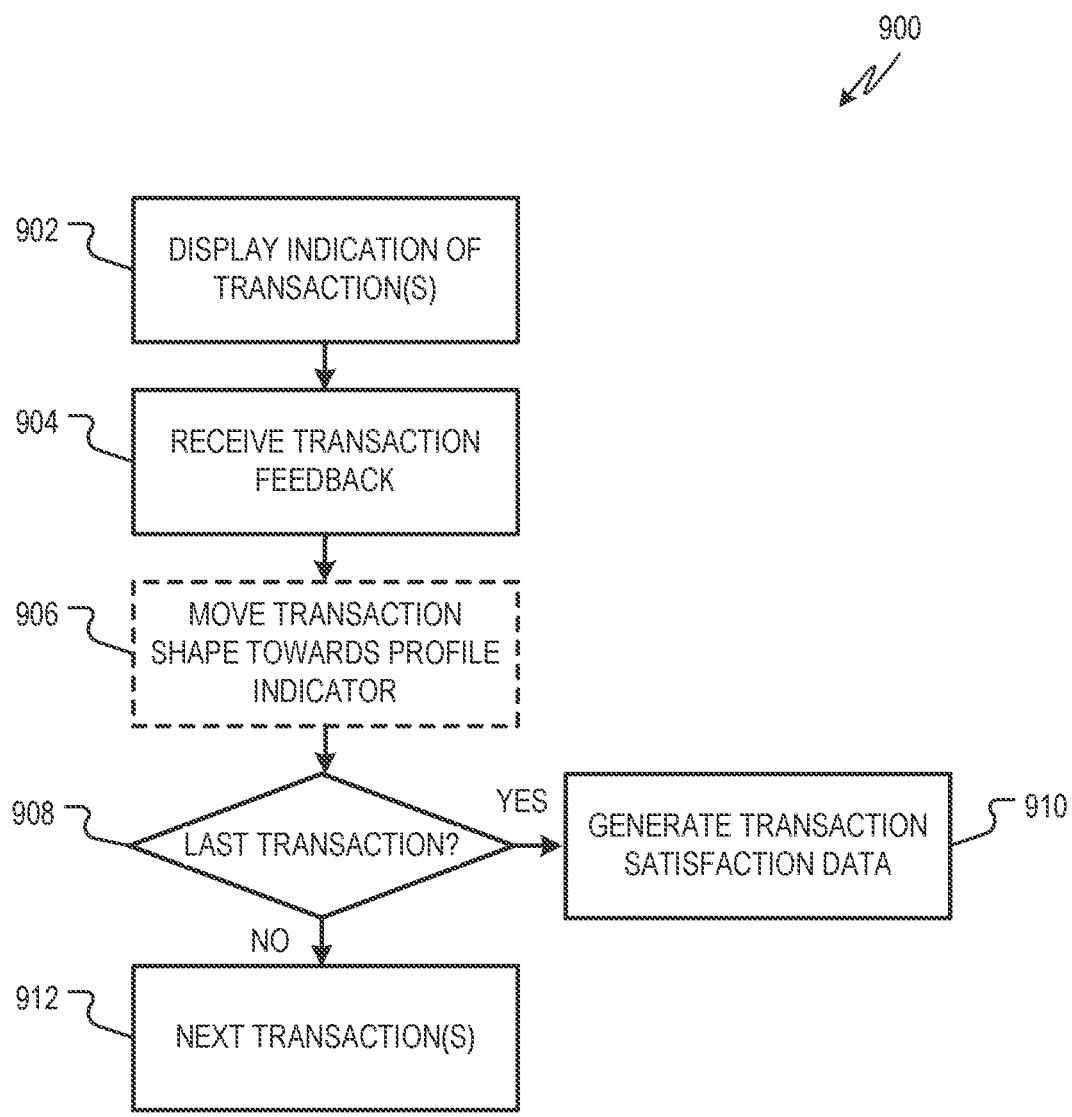
FIG. 9 is a flow chart showing one example of a process flow that may be executed by a computing system to gather transaction satisfaction data from a user.

FIG. 9 is a flow chart showing one example of a process flow 900 that may be executed by a computing system to gather transaction satisfaction data from a user. At operation 902, the computing system displays an indication of one or more transactions at a UI. The displayed transaction indicators may represent transactions that the user has recently completed. Example transaction indicators include the transaction indicators 132A, 132B, 132N shown in FIG. 1.

At operation 904, the computing system receives transaction feedback. The transaction feedback describes, for one or more of the transactions corresponding to the displayed transaction indicators, the user's level of satisfaction with the transaction. For example, a user may have a high level of satisfaction with a morning coffee purchase, but a lesser level of satisfaction with the purchase of a sugary donut. The user can provide transaction feedback in any suitable manner. For example, referring again to FIG. 1, the user may "swipe left" or "swipe right," as indicated by arrows 134A, 134B, 134N, with one swipe direction indicating satisfaction and the other swipe direction indicating a low level of satisfaction. For example, the user computing device may detect the swiping motion across the display. In some examples, the user provides more granular feedback. For example, the user may select a transaction indicator. In response, the computing system displays a chart allowing the user to select a satisfaction rating with additional levels of satisfaction.

At optional operation 906, the computing system moves a transaction shape towards either the negative financial profile indicator or the positive financial profile indicator. For example, the transaction shape may be animated across the screen. This may provide the user with an indication of whether their satisfaction level with the transaction is good or bad for their financial profile. For example, consider an example with a transaction that improves the user's financial profile. If the user indicates satisfaction with the transaction, the computing system may move a transaction shape from the transaction indicator towards the positive financial profile indicator. On the other hand, if the user indicates dissatisfaction with the transaction, the computing system moves a transaction shape from the transaction indicator towards the negative financial profile indicator. Consider another example with a transaction that worsens the user's financial profile. If the user indicates satisfaction with the transaction, the computing system may move the transaction shape towards the negative financial profile indicator. If the user indicates dissatisfaction with the transaction, the computing system may move the transaction shape towards the positive financial profile indicator.

At operation 908, the computing system determines if the transaction or transactions displayed at operation 902 are the last transactions to be described. If not, the computing system moves on to the next transaction(s) at operation 912, for example, by displaying an indication of the next transaction or transactions as described at operation 902. If feedback has been received on all desired transactions, the computing system generates transaction satisfaction data at operation 910. Transaction satisfaction data describes properties of transactions that satisfied the user and transactions that did not satisfy the user. The computing system may use the transaction satisfaction data to determine whether new transactions are likely to be satisfactory or unsatisfactory to the user.

Figure 10:
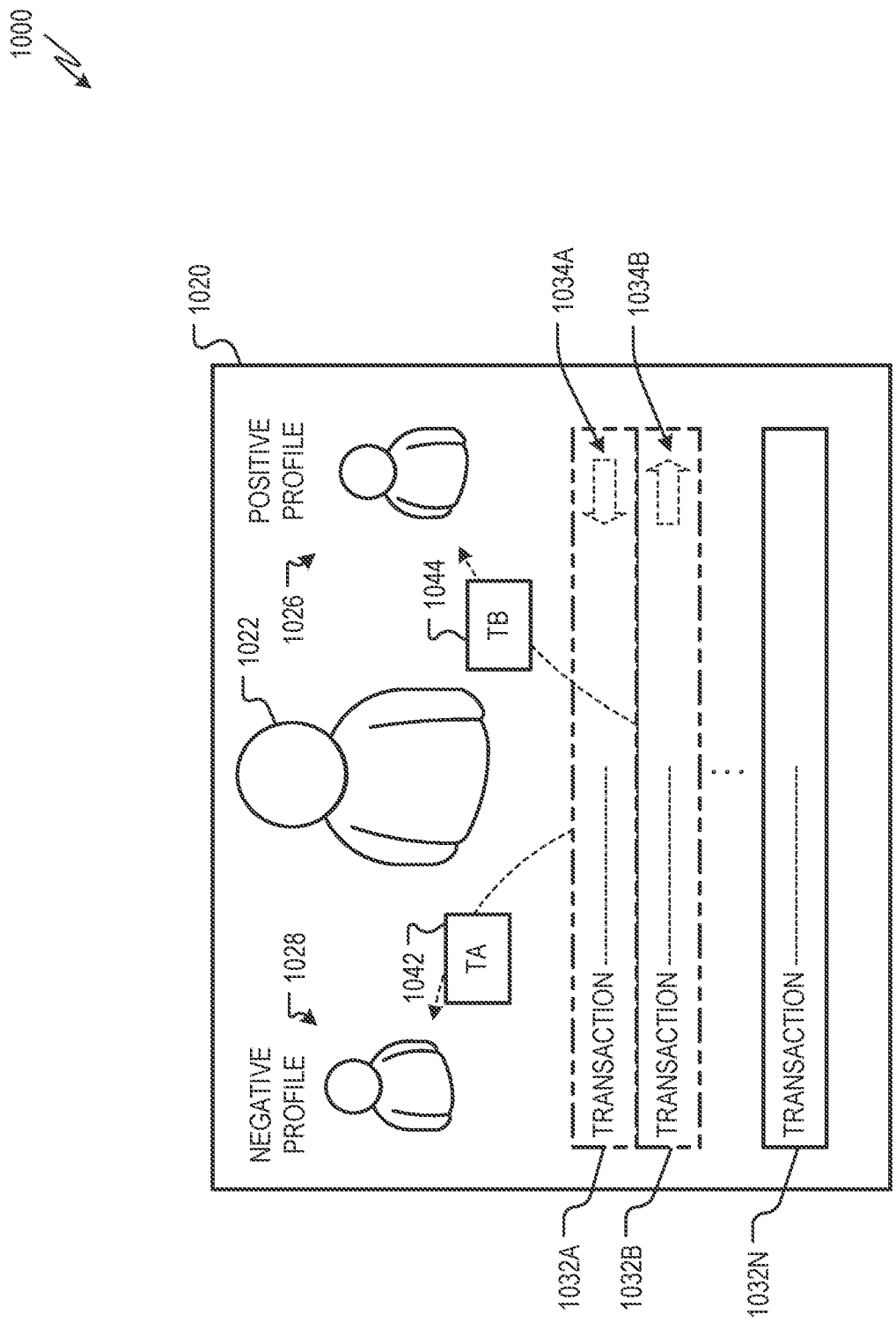
FIG. 10 is a diagram showing one example of a screen illustrating animated transaction shapes, for example, as described with respect to an optional operation from the process flow of FIG. 9.

FIG. 10 is a diagram showing one example of a screen 1020 illustrating animated transaction shapes, for example, as described with respect to optional operation 906 from the process flow 900. The screen 1020 includes a user financial profile indicator 1022, positive financial profile indicator 1026, and negative financial profile indicator 1028, similar to those described herein. Also shown are transaction indicators 1032A, 1032B, 1032N. The user provides satisfaction feedback in this example by swiping left or right. In this example, swiping left indicates satisfaction and swiping right indicates dissatisfaction. As indicated by arrow 1034A, the user swipes left on transaction indicator 1032A indicating dissatisfaction with the corresponding transaction. In response, the computing system causes a transaction shape 1042 to move from the transaction indicator 1032A towards the negative financial profile indicator 1028. In some examples, as the transaction shape 1042 begins to move, the transaction indicator 1032A disappears. For example, the transaction indicator 1032A may be morphed into the transaction shape 1042. Also, in some examples, the transaction indicator 1032A may be the transaction shape 1042. Similarly, the user swipes right on the transaction indicator 1032B, as indicated by arrow 1034B. This causes the computing system to move a second transaction shape 1044 towards the positive financial profile indicator 1026 as shown.

Figure 11:
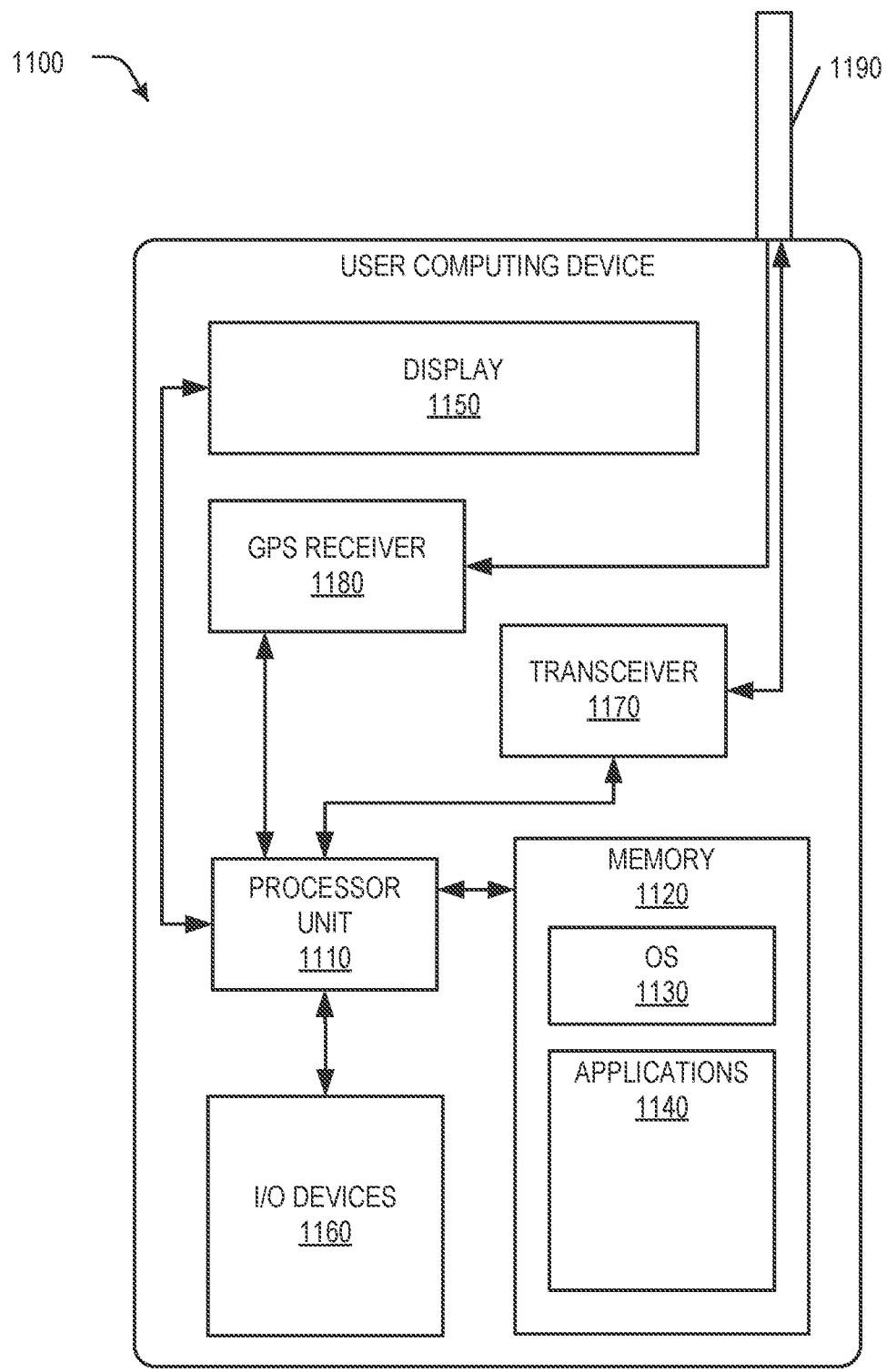
FIG. 11 is a block diagram showing an example architecture of a user computing device.

FIG. 11 is a block diagram showing an example architecture 1100 of a user computing device. The architecture 1100 may, for example, describe any of the computing devices or systems described herein, including, for example, the user computing devices 108A, 108B, the web server 106, the financial services system 104, expense system 118, income system 116, etc. The architecture 1100 comprises a processor unit 1110. The processor unit 1110 may include one or more processors. Any of a variety of different types of commercially available processors suitable for computing devices may be used (for example, an XScale architecture microprocessor, a Microprocessor without Interlocked Pipeline Stages (MIPS) architecture processor, or another type of processor). A memory 1120, such as a Random Access Memory (RAM), a flash memory, or another type of memory or data storage, is typically accessible to the processor unit 1110. The memory 1120 may be adapted to store an operating system (OS) 1130, as well as application programs 1140.

The processor unit 1110 may be coupled, either directly or via appropriate intermediary hardware, to a display 1150 and to one or more input/output (I/O) devices 1160, such as a keypad, a touch panel sensor, a microphone, and the like. Such I/O devices 1160 may include a touch sensor for capturing fingerprint data, a camera for capturing one or more images of the user, a retina scanner, or any other suitable devices. The I/O devices 1160 may be used to implement I/O channels, as described herein. In some examples, the I/O devices 1160 may also include sensors.

Similarly, in some examples, the processor unit 1110 may be coupled to a transceiver 1170 that interfaces with an antenna 1190. The transceiver 1170 may be configured to both transmit and receive cellular network signals, wireless data signals, or other types of signals via the antenna 1190, depending on the nature of the computing device implemented by the architecture 1100. Although one transceiver 1170 is shown, in some examples, the architecture 1100 includes additional transceivers. For example, a wireless transceiver may be utilized to communicate according to an IEEE 802.11 specification, such as Wi-Fi and/or a short-range communication medium. Some short-range communication mediums, such as NFC, may utilize a separate, dedicated transceiver. Further, in some configurations, a Global Positioning System (GPS) receiver 1180 may also make use of the antenna 1190 to receive GPS signals. In addition to or instead of the GPS receiver 1180, any suitable location-determining sensor may be included and/or used, including, for example, a Wi-Fi positioning system. In some examples, the architecture 1100 (e.g., the processor unit 1110) may also support a hardware interrupt. In response to a hardware interrupt, the processor unit 1110 may pause its processing and execute an interrupt service routine (ISR).

Figure 12:
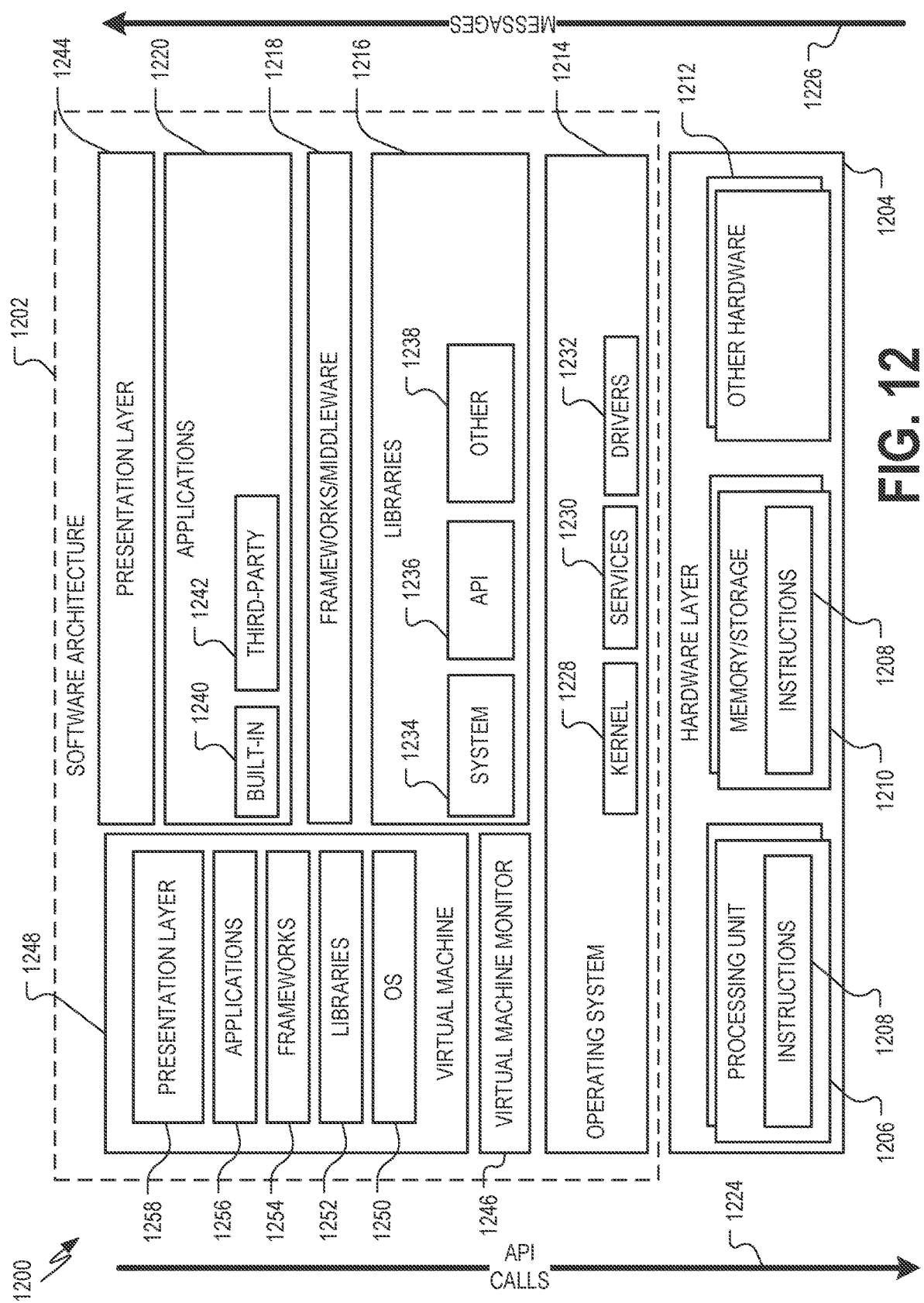
FIG. 12 is a block diagram showing one example of a software architecture for a computing device.

FIG. 12 is a block diagram 1200 showing one example of a software architecture 1202 for a computing device. The software architecture 1202 may be used in conjunction with various hardware architectures, for example, as described herein. FIG. 12 is merely a non-limiting example of a software architecture 1202, and many other architectures may be implemented to facilitate the functionality described herein. A representative hardware layer 1204 is illustrated and can represent, for example, any of the above-referenced computing devices. In some examples, the hardware layer 1204 may be implemented according to an architecture 1300 of FIG. 13 and/or the architecture 1100 of FIG. 11.

The representative hardware layer 1204 comprises one or more processing units 1206 having associated executable instructions 1208. The executable instructions 1208 represent the executable instructions of the software architecture 1202, including implementation of the methods, modules, components, and so forth of FIGS. 1-10. The hardware layer 1204 also includes memory and/or storage modules 1210, which also have the executable instructions 1208. The hardware layer 1204 may also comprise other hardware 1212, which represents any other hardware of the hardware layer 1204, such as the other hardware illustrated as part of the architecture 1300.

In the example architecture of FIG. 12, the software architecture 1202 may be conceptualized as a stack of layers where each layer provides particular functionality. For example, the software architecture 1202 may include layers such as an operating system 1214, libraries 1216, frameworks/middleware 1218, applications 1220, and a presentation layer 1244. Operationally, the applications 1220 and/or other components within the layers may invoke application programming interface (API) calls 1224 through the software stack and receive a response, returned values, and so forth illustrated as messages 1226 in response to the API calls 1224. The layers illustrated are representative in nature and not all software architectures have all layers. For example, some mobile or special-purpose operating systems may not provide a frameworks/middleware 1218 layer, while others may provide such a layer. Other software architectures may include additional or different layers.

The operating system 1214 may manage hardware resources and provide common services. The operating system 1214 may include, for example, a kernel 1228, services 1230, and drivers 1232. The kernel 1228 may act as an abstraction layer between the hardware and the other software layers. For example, the kernel 1228 may be responsible for memory management, processor management (e.g., scheduling), component management, networking, security settings, and so on. The services 1230 may provide other common services for the other software layers. In some examples, the services 1230 include an interrupt service. The interrupt service may detect the receipt of a hardware or software interrupt and, in response, cause the software architecture 1202 to pause its current processing and execute an ISR when an interrupt is received. The ISR may generate an alert.

The drivers 1232 may be responsible for controlling or interfacing with the underlying hardware. For instance, the drivers 1232 may include display drivers, camera drivers, Bluetooth® drivers, flash memory drivers, serial communication drivers (e.g., Universal Serial Bus (USB) drivers), Wi-Fi® drivers, NFC drivers, audio drivers, power management drivers, and so forth depending on the hardware configuration.

The libraries 1216 may provide a common infrastructure that may be utilized by the applications 1220 and/or other components and/or layers. The libraries 1216 typically provide functionality that allows other software modules to perform tasks in an easier fashion than by interfacing directly with the underlying operating system 1214 functionality (e.g., kernel 1228, services 1230, and/or drivers 1232). The libraries 1216 may include system libraries 1234 (e.g., C standard library) that may provide functions such as memory allocation functions, string manipulation functions, mathematic functions, and the like. In addition, the libraries 1216 may include API libraries 1236 such as media libraries (e.g., libraries to support presentation and manipulation of various media formats such as MPEG4, H.264, MP3, AAC, AMR, JPG, and PNG), graphics libraries (e.g., an OpenGL framework that may be used to render 2D and 3D graphic content on a display), database libraries (e.g., SQLite that may provide various relational database functions), web libraries (e.g., WebKit that may provide web browsing functionality), and the like. The libraries 1216 may also include a wide variety of other libraries 1238 to provide many other APIs to the applications 1220 and other software components/modules.

The frameworks 1218 (also sometimes referred to as middleware) may provide a higher-level common infrastructure that may be utilized by the applications 1220 and/or other software components/modules. For example, the frameworks 1218 may provide various graphical user interface (UI) functions, high-level resource management, high-level location services, and so forth. The frameworks 1218 may provide a broad spectrum of other APIs that may be utilized by the applications 1220 and/or other software components/modules, some of which may be specific to a particular operating system or platform.

The applications 1220 include built-in applications 1240 and/or third-party applications 1242. Examples of representative built-in applications 1240 may include, but are not limited to, a contacts application, a browser application, a book reader application, a location application, a media application, a messaging application, and/or a game application. The third-party applications 1242 may include any of the built-in applications 1240 as well as a broad assortment of other applications. In a specific example, the third-party application 1242 (e.g., an application developed using the Android™ or iOS™ software development kit (SDK) by an entity other than the vendor of the particular platform) may be mobile software running on a mobile operating system such as iOS™, Android™, Windows® Phone, or other computing device operating systems. In this example, the third-party application 1242 may invoke the API calls 1224 provided by the mobile operating system such as the operating system 1214 to facilitate functionality described herein.

The applications 1220 may utilize built-in operating system functions (e.g., kernel 1228, services 1230, and/or drivers 1232), libraries (e.g., system libraries 1234, API libraries 1236, and other libraries 1238), or frameworks/middleware 1218 to create user interfaces to interact with users of the system. Alternatively, or additionally, in some systems, interactions with a user may occur through a presentation layer, such as the presentation layer 1244. In these systems, the application/module "logic" can be separated from the aspects of the application/module that interact with a user.

Some software architectures utilize virtual machines. For example, systems described herein may be executed utilizing one or more virtual machines executed at one or more server computing machines. In the example of FIG. 12, this is illustrated by a virtual machine 1248. A virtual machine creates a software environment where applications/modules can execute as if they were executing on a hardware computing device. The virtual machine 1248 is hosted by a host operating system (e.g., the operating system 1214) and typically, although not always, has a virtual machine monitor 1246, which manages the operation of the virtual machine 1248 as well as the interface with the host operating system (e.g., the operating system 1214). A software architecture executes within the virtual machine 1248, such as an operating system 1250, libraries 1252, frameworks/middleware 1254, applications 1256, and/or a presentation layer 1258. These layers of software architecture executing within the virtual machine 1248 can be the same as corresponding layers previously described or may be different.

Figure 13:
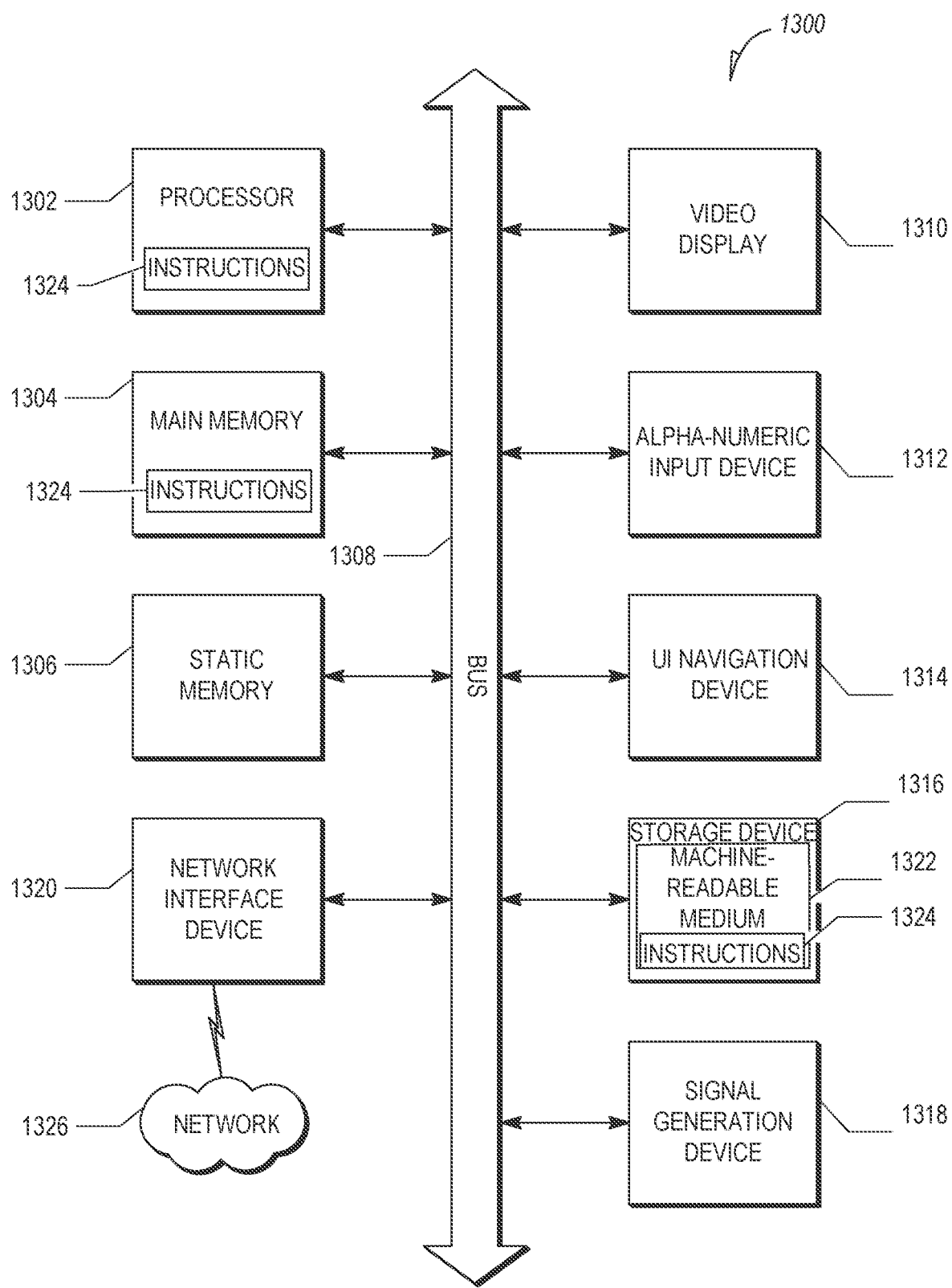
FIG. 13 is a block diagram illustrating a computing device hardware architecture, within which a set or sequence of instructions can be executed to cause a machine to perform examples of any one of the methodologies discussed herein.

FIG. 13 is a block diagram illustrating a computing device hardware architecture 1300, within which a set or sequence of instructions can be executed to cause a machine to perform examples of any one of the methodologies discussed herein. The architecture 1300 may describe, for example, any of the computing devices and/or control circuits described herein. The architecture 1300 may execute the software architecture 1202 described with respect to FIG. 12. The architecture 1300 may operate as a standalone device or may be connected (e.g., networked) to other machines. In a networked deployment, the architecture 1300 may operate in the capacity of either a server or a client machine in server-client network environments, or it may act as a peer machine in peer-to-peer (or distributed) network environments. The architecture 1300 can be implemented in a personal computer (PC), a tablet PC, a hybrid tablet, a set-top box (STB), a personal digital assistant (PDA), a mobile telephone, a web appliance, a network router, a network switch, a network bridge, or any machine capable of executing instructions (sequential or otherwise) that specify operations to be taken by that machine.

The example architecture 1300 includes a processor unit 1302 comprising at least one processor (e.g., a central processing unit (CPU), a graphics processing unit (GPU), or both, processor cores, compute nodes, etc.). The architecture 1300 may further comprise a main memory 1304 and a static memory 1306, which communicate with each other via a link 1308 (e.g., a bus). The architecture 1300 can further include a video display unit 1310, an alphanumeric input device 1312 (e.g., a keyboard), and a UI navigation device 1314 (e.g., a mouse). In some examples, the video display unit 1310, alphanumeric input device 1312, and UI navigation device 1314 are incorporated into a touchscreen display. The architecture 1300 may additionally include a storage device 1316 (e.g., a drive unit), a signal generation device 1318 (e.g., a speaker), a network interface device 1320, and one or more sensors (not shown), such as a GPS sensor, compass, accelerometer, or other sensor.

In some examples, the processor unit 1302 or another suitable hardware component may support a hardware interrupt. In response to a hardware interrupt, the processor unit 1302 may pause its processing and execute an ISR, for example, as described herein.

The storage device 1316 includes a machine-readable medium 1322 on which is stored one or more sets of data structures and instructions 1324 (e.g., software) embodying or utilized by any one or more of the methodologies or functions described herein. The instructions 1324 can also reside, completely or at least partially, within the main memory 1304, within the static memory 1306, and/or within the processor unit 1302 during execution thereof by the architecture 1300, with the main memory 1304, the static memory 1306, and the processor unit 1302 also constituting machine-readable media. The instructions 1324 stored at the machine-readable medium 1322 may include, for example, instructions for implementing the software architecture 1202, instructions for executing any of the features described herein, etc.

While the machine-readable medium 1322 is illustrated in an example to be a single medium, the term "machine-readable medium" can include a single medium or multiple media (e.g., a centralized or distributed database, and/or associated caches and servers) that store the one or more instructions 1324. The term "machine-readable medium" shall also be taken to include any tangible medium that is capable of storing, encoding, or carrying instructions for execution by the machine and that cause the machine to perform any one or more of the methodologies of the present disclosure, or that is capable of storing, encoding, or carrying data structures utilized by or associated with such instructions. The term "machine-readable medium" shall accordingly be taken to include, but not be limited to, solid-state memories, and optical and magnetic media. Specific examples of machine-readable media include non-volatile memory, including, but not limited to, by way of example, semiconductor memory devices (e.g., electrically programmable read-only memory (EPROM) and electrically erasable programmable read-only memory (EEPROM)) and flash memory devices; magnetic disks such as internal hard disks and removable disks; magneto-optical disks; and CD-ROM and DVD-ROM disks.

The instructions 1324 can further be transmitted or received over a communications network 1326 using a transmission medium via the network interface device 1320 utilizing any one of a number of well-known transfer protocols (e.g., hypertext transfer protocol (HTTP)). Examples of communication networks include a LAN, a WAN, the Internet, mobile telephone networks, plain old telephone service (POTS) networks, and wireless data networks (e.g., Wi-Fi, 3G, and 5G LTE/LTE-A or WiMAX networks). The term "transmission medium" shall be taken to include any intangible medium that is capable of storing, encoding, or carrying instructions for execution by the machine, and includes digital or analog communications signals or other intangible media to facilitate communication of such software.

Various components are described in the present disclosure as being configured in a particular way. A component may be configured in any suitable manner. For example, a component that is or that includes a computing device may be configured with suitable software instructions that program the computing device. A component may also be configured by virtue of its hardware arrangement or in any other suitable manner.

The above description is intended to be illustrative, and not restrictive. For example, the above-described examples (or one or more aspects thereof) can be used in combination with others. Other embodiments can be used, such as by one of ordinary skill in the art upon reviewing the above description. The Abstract is to allow the reader to quickly ascertain the nature of the technical disclosure, for example, to comply with 37 C.F.R. § 1.72(b) in the United States of America. It is submitted with the understanding that it will not be used to interpret or limit the scope or meaning of the claims.

Also, in the above Detailed Description, various features can be grouped together to streamline the disclosure. However, the claims cannot set forth every feature disclosed herein, as embodiments can feature a subset of said features. Further, embodiments can include fewer features than those disclosed in a particular example. Thus, the following claims are hereby incorporated into the Detailed Description, with each claim standing on its own as a separate embodiment. The scope of the embodiments disclosed herein is to be determined with reference to the appended claims, along with the full scope of equivalents to which such claims are entitled.

What is claimed is:

1. A system for interfacing a computing system to a human user, the system comprising:
   at least one processor unit programmed to perform operations comprising:
      providing a user interface at a display of a user computing device, wherein the user interface comprises:
         a positive financial profile indicator on the display;

a negative financial profile indicator on the display opposite the positive financial profile indicator; and a user financial profile indicator describing a user, user financial profile indicator comprising a directed element that is pointable towards the positive financial profile indicator and is alternatively pointable towards the negative financial profile indicator;

receiving user transaction data describing a financial transaction of the user;

displaying at the user interface a financial transaction indicator indicative of the financial transaction;

determining that the financial transaction causes a negative change in a financial profile of the user;

receiving a first input from the user via the user interface, the first input classifying the financial transaction as a low-satisfaction transaction; and responsive to the first input, modifying the user interface to point the directed element of the user financial profile indicator towards the negative financial profile indicator.

2. The system of claim 1, the operations further comprising, responsive to the first input, displaying a transaction shape moving across the user interface from the financial transaction indicator towards the negative financial profile indicator.

3. The system of claim 1, the operations further comprising:

receiving cohort financial data describing a cohort of users including the user;

determining a positive financial profile describing a first set of users from the cohort of users; and determining a negative financial profile describing a second set of users from the cohort of users.

4. The system of claim 3, the operations further comprising:

receiving user financial profile data describing a user financial profile of the user;

updating the user financial profile based at least in part on the financial transaction to generate an updated user financial profile; and determining that the updated user financial profile is within a threshold of the negative financial profile.

5. The system of claim 4, the operations further comprising pushing an alert to an output device of the user computing device, wherein the alert describes the financial transaction.

6. The system of claim 5, the operations further comprising:

accessing user transaction satisfaction data describing a user satisfaction level for financial transactions; and before pushing the alert to the output device of the user computing device, classifying the financial transaction as a low-satisfaction transaction based at least in part on the user transaction satisfaction data.

7. The system of claim 1, the operations further comprising:

displaying at the display of the user computing device an indication of a first previous financial transaction of the user;

receiving at least one input from the user via the user interface classifying the first previous financial transaction as a low-satisfaction transaction;

displaying at the display of the user computing device an indication of a second previous financial transaction of the user;

receiving at least one input from the user via the user interface classifying the second previous financial transaction as a high-satisfaction transaction; and generating user transaction satisfaction data based at least in part on the at least one input from the user via the user interface classifying the first previous financial transaction as a low-satisfaction transaction and the at least one input from the user via the user interface classifying the second previous financial transaction as a high-satisfaction transaction.

8. The system of claim 7, wherein receiving the at least one input classifying the first previous financial transaction as a low-satisfaction transaction comprises detecting a swiping motion across the display in a first direction, and wherein receiving the at least one input classifying the second previous financial transaction as a high-satisfaction transaction comprises detecting a swiping motion across the display in a second direction opposite the first direction.

9. The system of claim 7, wherein the positive financial profile indicator and the negative financial profile indicator are displayed at the display of the user computing device at the same time as the indication of the first previous financial transaction, the operations further comprising moving a first previous transaction indicator shape indicating the first previous financial transaction towards the negative financial profile indicator.

10. A computer-implemented method for interfacing a computing system to a human user, the method comprising:

providing a user interface at a display of a user computing device, wherein the user interface comprises:

a positive financial profile indicator on the display;

a negative financial profile indicator on the display opposite the positive financial profile indicator; and a user financial profile indicator describing a user, the user financial profile indicator comprising a directed element that is pointable towards the positive financial profile indicator and is alternatively pointable towards the negative financial profile indicator;

receiving user transaction data describing a financial transaction of the user;

displaying at the user interface a financial transaction indicator indicative of the financial transaction;

determining that the financial transaction causes a negative change in a financial profile of the user;

receiving a first input from the user via the user interface, the first input classifying the financial transaction as a low-satisfaction transaction; and responsive to the first input, modifying the user interface to point the directed element of the user financial profile indicator towards the negative financial profile indicator.

11. The method of claim 10, further comprising, responsive to the first input, displaying a transaction shape moving across the user interface from the financial transaction indicator towards the negative financial profile indicator.

12. The method of claim 10, further comprising:

receiving cohort financial data describing a cohort of users including the user;

determining a positive financial profile describing a first set of users from the cohort of users; and determining a negative financial profile describing a second set of users from the cohort of users.

13. The method of claim 12, further comprising:

receiving user financial profile data describing a user financial profile of the user;

updating the user financial profile based at least in part on the financial transaction to generate an updated user financial profile; and determining that the updated user financial profile is within a threshold of the negative financial profile.

14. The method of claim 13, further comprising pushing an alert to an output device of the user computing device, wherein the alert describes the financial transaction.

15. The method of claim 14, further comprising:

accessing user transaction satisfaction data describing a user satisfaction level for financial transactions; and before pushing the alert to the output device of the user computing device, classifying the financial transaction as a low-satisfaction transaction based at least in part on the user transaction satisfaction data.

16. The method of claim 10, further comprising:

displaying at the display of the user computing device an indication of a first previous financial transaction of the user;

receiving at least one input from the user via the user interface classifying the first previous financial transaction as a low-satisfaction transaction;

displaying at the display of the user computing device an indication of a second previous financial transaction of the user;

receiving at least one input from the user via the user interface classifying the second previous financial transaction as a high-satisfaction transaction; and generating user transaction satisfaction data based at least in part on the at least one input from the user via the user interface classifying the first previous financial transaction as a low-satisfaction transaction and the at least one input from the user via the user interface classifying the second previous financial transaction as a high-satisfaction transaction.

17. The method of claim 16, wherein receiving the at least one input classifying the first previous financial transaction as a low-satisfaction transaction comprises detecting a swiping motion across the display in a first direction, and wherein receiving the at least one input classifying the second previous financial transaction as a high-satisfaction transaction comprises detecting a swiping motion across the display in a second direction opposite the first direction.

18. The method of claim 16, wherein the positive financial profile indicator and the negative financial profile indicator are displayed at the display of the user computing device at the same time as the indication of the first previous financial transaction, further comprising moving a first previous transaction indicator shape indicating the first previous financial transaction towards the negative financial profile indicator.

19. A non-transitory machine-readable medium comprising instructions thereon, that when executed by at least one processor unit, cause the at least one processor unit to perform operations comprising:

providing a user interface at a display of a user computing device, wherein the user interface comprises:

a positive financial profile indicator on the display;

a negative financial profile indicator on the display opposite the positive financial profile indicator; and a user financial profile indicator describing a user, the user financial profile indicator comprising a directed element that is pointable towards the positive financial profile indicator and is alternatively pointable towards the negative financial profile indicator;

receiving user transaction data describing a financial transaction of the user;

displaying at the user interface a financial transaction indicator indicative of the financial transaction;

determining that the financial transaction causes a negative change in a financial profile of the user;

receiving a first input from the user via the user interface, the first input classifying the financial transaction as a low-satisfaction transaction; and responsive to the first input, modifying the user interface to point the directed element of the user financial profile indicator towards the negative financial profile indicator.

20. The non-transitory machine-readable medium of claim 19, the operations further comprising, responsive to the first input, displaying a transaction shape moving across the user interface from the financial transaction indicator towards the negative financial profile indicator.

* * * * *